United States Patent Office 3,309,430
Patented Mar. 14, 1967

3,309,430
SYNTHESIS OF MONOHALOPHOSPHONITES
Erwin Steininger, Hachenburgerstrasse 3, 623 Frankfurt am Main-Sossenheim, Germany
No Drawing. Filed July 10, 1963, Ser. No. 294,146
7 Claims. (Cl. 260—972)

The invention relates to the syntheses of novel monohalophosphonites of the general type:

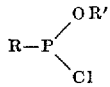

where R and R' are identical or different and either denote alkyl (preferably lower alkyl), cycloalkyl, aryl or aralkyl radicals.

The alcohol and the chlorine groups of phosphites and phosphorus trichloride are known to be interchangeable; if these compounds are mixed at elevated temperature, chlorophosphites and dichlorophosphites are formed in equilibrium with the starting reactants.

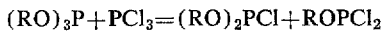

It is a known fact that interaction of phosphonites or phosphinites with phosphorus trichloride yields chlorophosphines in addition to various chlorophosphites in chemical equilibrium with the starting compounds. An excess of $PCl_3$ has to be used in order to reach yields of, say, 50 percent.

It is a new finding that this exchange can also be effected on phosphonites and dichlorophosphines according to the equation

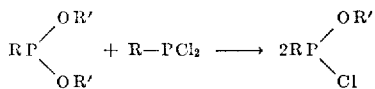

It is known to cause the conproportionation of phosphonous acid with phosphonites to give a monoester of phosphonous acid. However, since this conproportionation takes place at temperatures between 100 and 160° C., the reaction merely yields compounds of pentavalent phosphorus. The same applies to U.S. Patent 2,860,155. The monoesters derived from trivalent phosphorus as claimed by the present specification are stable at best up to temperatures of 100° C.

It has been discovered that monohalophosphonites of the type specified are formed in very high yields if molar quantities of phosphonite of the general form $R—P(OR')_2$ and dichlorophosphine of the general form $R—PCl_2$ (R and R' having the meaning defined earlier) are caused to react in solvents, preferably in diethyl ether, at temperatures between −50 and +100° C., preferably at 0 to 10° C. As a matter of course, only molar quantities of the reactants can be used in this case, so that the reactants were expected to be in equilibrium with the monohalophosphonite. Surprisingly it was found, however, that the equilibrium is completely shifted to the right. No starting reactants were recovered by distillation. Mainly in the aliphatic series these compounds are very unstable and decompose rapidly at temperatures above 40° C. In the aromatic series low homologues could be distilled in the vacuum at 75° C. For most purposes however, it is not necessary to isolate these compounds so that they can be submitted to further reactions—even in solutions— right after their formation.

Examples of dichlorophosphines suitable as starting compounds include: phenyldichlorophosphine, ethyldichlorophosphine, butyldichlorophosphine. These compounds can be prepared by conventional methods (cf. G.M. Kosolapoff, Organophosphorus Compounds, New York, 1950, p. 42 et seq.). The necessary phosphonites are obtainable, for example, by alcoholysis of these dichlorophosphines or by interaction of monochlorophosphites with organometal compounds. Since these compounds undergo oxidation and hydrolysis with ease, all operation should be carried out in the absence of oxygen and moisture. Suitable solvents are those that are inert toward the reactants.

The substances made according to the process claimed herein are new marketable products of a diversity of commercial applications. They can be used directly, for example, as oxidation stabilizers and as pesticides, or indirectly after further reaction to replace the halogen with the desired moiety as valuable additives in various compositions, for example, as additives for lubricants.

The following examples are presented for the purpose of illustrating the invention without the intent of limiting the same.

Example 1

To 45 grams (0.3 mole) of diethyl-ethylphosphonite in 300 ml. ether was added dropwise 39.3 grams (0.3 mole) of ethyldichlorophosphine at 0 to 10° C. After two hours the solvent was stripped in the vacuum, followed by mild distillation at 18 mm. Hg and 35 to 36° C. to give 65 grams (77% of the theory) of pure ethyl-chloro-ethylphosphonite. $n_D^{23}$: 1.4550, $P_{found}$ 22.2%, $P_{calc.}$ 22.0%, $Cl_{found}$ 24.4%, $Cl_{calc.}$ 24.9%.

Example 2

To 29.8 grams (0.15 mole) of diethyl-phenylphosphonite in 100 ml. ether was added dropwise 26.8 grams (0.15 mole) of phenyldichlorophosphine in 100 ml. ether at 0 to 10° C. The solvent was stripped in the vacuum after one hour, followed by mild distillation at 0.5 mm. Hg and 74 to 75° C. to give 47 grams (74% of the theory) of pure ethyl-chloro-phenylphosphonite. $n_D^{22}$: 1.5661, $P_{found}$ 16.3%, $P_{calc.}$ 16.4%, $Cl_{found}$ 19.1%, $Cl_{calc.}$ 18.8%.

Example 3

To 15.9 grams (0.1 mole) of butyldichlorophosphine in 150 ml. ether was added dropwise 17.8 grams (0.1 mole) of diethyl-butylphosphonite. After refluxing for two hours, a Grignard solution composed of 18.5 grams (0.2 mole) of chlorobutane and 4.9 grams (0.2 mole) of magnesium turnings in 200 ml. ether was added dropwise. On storing overnight the solution was sucked off from the magnesium chloride and distilled. At 17 mm. Hg and temperatures between 98 and 101° C., 16 grams (42% of the theory) of ethyldibutylphosphinite was obtained. $n_D^{20}$: 1.4482, $P_{found}$ 16.2%, $P_{calc.}$ 16.3%.

Example 4

To 26.2 grams (0.2 mole) of ethyldichlorophosphine in 150 ml. of ether was added dropwise 30 grams (0.2 mole) of diethyl-ethylphosphonite. At −10° C. the reaction product was added dropwise to 34 grams (0.44 mole) of pyridine and 32.6 grams (0.44 mole) of n-butyl alcohol in 100 ml. of ether, followed by filtration from the precipitated pyridinium salt and distillation of the solvent. At 15 mm. Hg and temperatures between 74 and 78° C., 43 grams (61% of the theory) of ethyl-butyl-ethylphosphonite was obtained. $n_D^{20}$: 1.4331, $P_{found}$ 17.7%, $P_{calc.}$ 17.4%.

I claim:
1. Method for the synthesis of monohalophosphonites of the formula

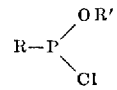

wherein R and R' are radicals selected from the group consisting of alkyl, and phenyl, comprising reacting in an inert solvent molar quantities of a dichlorophosphine of the formula

with a phosphonite of the formula

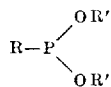

wherein R and R' have the meaning defined above.

2. The method according to claim 1 wherein said solvent is diethyl ether.

3. The method according to claim 1 wherein said alkyl group comprises a lower alkyl group containing 1–4 carbon atoms.

4. The method according to claim 1 in which said reaction is carried out at a temperature between minus 50° C. and plus 100° C.

5. The method according to claim 4 wherein said temperature is in the range of 0 to 10° C.

6. The method according to claim 1 wherein said phosphonite is diethyl-ethylphosphonite.

7. The method according to claim 1 werein said dichlorophosphine is ethyldichlorophosphine.

References Cited by the Examiner

UNITED STATES PATENTS 1,139,491  11/1962  Germany.

CHARLES B. PARKER, *Primary Examiner.*

JOSEPH P. BRUST, *Examiner.*

F. M. SIKORA, B. BILLIAN, *Assistant Examiners.*

UNITED STATES PATENT OFFICE
CERTIFICATE OF CORRECTION

Patent No. 3,309,430                                   March 14, 1967

Erwin Steininger

It is hereby certified that error appears in the above numbered patent requiring correction and that the said Letters Patent should read as corrected below.

In the heading to the printed specification, lines 3 and 4, for "Erwin Steininger, Hachenburgerstrasse 3, 623 Frankfurt am Main-Sossenheim, Germany" read -- Erwin Steininger, Frankfurt am Main-Sossenheim, Germany, assignor to Armstrong Cork Company Lancaster, Pa., a corporation of Pennsylvania --.

Signed and sealed this 14th day of November 1967.

(SEAL)
Attest:

Edward M. Fletcher, Jr.                              EDWARD J. BRENNER
Attesting Officer                                        Commissioner of Patents